United States Patent [19]
Wolff

[11] Patent Number: 5,088,889
[45] Date of Patent: Feb. 18, 1992

[54] SEAL FOR A FLOW MACHINE

[75] Inventor: Karl-Heinz Wolff, Riedenzhofen, Fed. Rep. of Germany

[73] Assignee: MTU Motoren-Und Turbinen-Union Muenchen GmbH, Munich, Fed. Rep. of Germany

[21] Appl. No.: 253,011

[22] Filed: Sep. 20, 1988

Related U.S. Application Data

[63] Continuation-in-part of Ser. No. 925,801, Dec. 15, 1986, abandoned.

[30] Foreign Application Priority Data

Feb. 16, 1985 [DE] Fed. Rep. of Germany ....... 3505491

[51] Int. Cl.$^5$ .............................................. F01D 11/08
[52] U.S. Cl. ............................. 415/171.1; 415/173.7; 277/53
[58] Field of Search ................ 416/192.92; 415/170.1, 415/171.1, 173.1, 173.7; 277/53

[56] References Cited

U.S. PATENT DOCUMENTS

| | | | |
|---|---|---|---|
| 3,339,933 | 9/1967 | Foster | 415/174 |
| 3,447,741 | 6/1969 | Havette et al. | 415/172 A |
| 3,572,728 | 3/1971 | Smuland | 415/172 A |
| 3,876,330 | 4/1975 | Pearson et al. | 415/172 A |
| 3,897,169 | 7/1975 | Fowler | 415/172 A |

FOREIGN PATENT DOCUMENTS

| | | | |
|---|---|---|---|
| 313128 | 7/1917 | Fed. Rep. of Germany | 415/172 A |
| 103910 | 8/1979 | Japan | 415/172 A |
| 65804 | 4/1982 | Japan | 415/172 A |
| 134451 | 7/1929 | Switzerland | 415/172 A |
| 663861 | 5/1979 | U.S.S.R. | 415/172 A |

*Primary Examiner*—John T. Kwon
*Attorney, Agent, or Firm*—Barnes & Thornburg

[57] ABSTRACT

A seal for sealing the space between a rotor and stator of an axial flow machine is disclosed which includes axially spaced sealing points. Between the sealing points auxiliary blades are provided for inducing turbulence to assist in improving the seal between pressure spaces located upstream and downstream of the sealing points.

10 Claims, 3 Drawing Sheets

SEAL FOR A FLOW MACHINE

BACKGROUND & SUMMARY OF THE INVENTION

This application is a Continuation-in-part of application Ser. No. 925,801 filed Oct. 10, 1986.

The invention relates to a seal in the space between the rotor and the stator, such as in a housing of a flow machine, especially in an axial flow turbine, a compressor, a blower, a charger or the like, which seal separates two chambers of varying pressure in the axial direction of the rotor.

Seals of this type currently are usually designed as labyrinth seals consisting of a number of successively interrelated throttling points (sealing points) with labyrinth chambers located in-between. Fluid seals with capsulated chambers are also known. The sealing action in this case is caused by energy losses in the space between the rotating sealing point and the stator. The amount of leakage flowing through the sealing space is almost independent of the speed of the rotor.

It is an objective of the invention to provide a type of seal that, irrespectively of whether one or several sealing points are connected in front of or behind the blading, develops its effect, in particular, progressively as the rotational speed of the rotor increase..

This objective is achieved by providing auxiliary blades between the sealing points to induce turbulent flow in the chamber intermediate the sealing points. By means of the auxiliary blades, their arrangement and their development, the amount of leakage of flow medium that can still flow through the space between the rotor and the stator is reduced progressively. By means of the swirling in the chamber that rises with the rotational speed, this effect is increased and if the auxiliary blades are designed correspondingly, a return flow from the chamber of lower pressure to the chamber of higher pressure may even be achieved. This also applies if the auxiliary blades are mounted not only at the rotating component but also at the stator with respect to the chamber (with the same center line). In this case, only the attack angle of the blades must be selected inversely.

By means of the invention, a lowering of the amount of leakage can be easily achieved to 50% of the previous amount (for an otherwise similar construction). Particularly advantageously, the invention can be used in the case of high-speed flow machine (approximately up to 50,000 rpm$^{-1}$) in stationary and transportable steam turbines and gas turbines for vehicles or aircrafts or other applications of general mechanical engineering. The use of the invention is limited only in the case of turbines that have so-called intake linings, in particular, on an interior wall of the housing because in every case the height of the auxiliary blades (outside diameter) must definitely be within the scope of the intake range. The auxiliary blades according to the invention must be securable at the rotor disks (for example, by welding and soldering) and must be produceable together with these by means of conventional techniques, such as casting and milling. Like the choice of material, the production process depends on those of the basic materials of the rotor disk and/or the moving blade or a guide blade and/or a wall of the housing in order to be able to be processed or manufactured in one operation with it or be easily mountable at it. At this point, the choice of material depends primarily on the usage or operating conditions of the flow machine, i.e., its purpose and related technical data.

Other objects, advantages and novel features of the present invention will become apparent from the following detailed description of the invention when considered in conjunction with the accompanying drawings.

BRIEF DESCRIPTION OF THE DRAWINGS

Embodiments of the invention are shown only in diagram form in the attached drawing.

FIG. 1b is a developed view on a rotor according to FIG. 1a;

DETAILED DESCRIPTION OF THE DRAWINGS

Figure 1A:
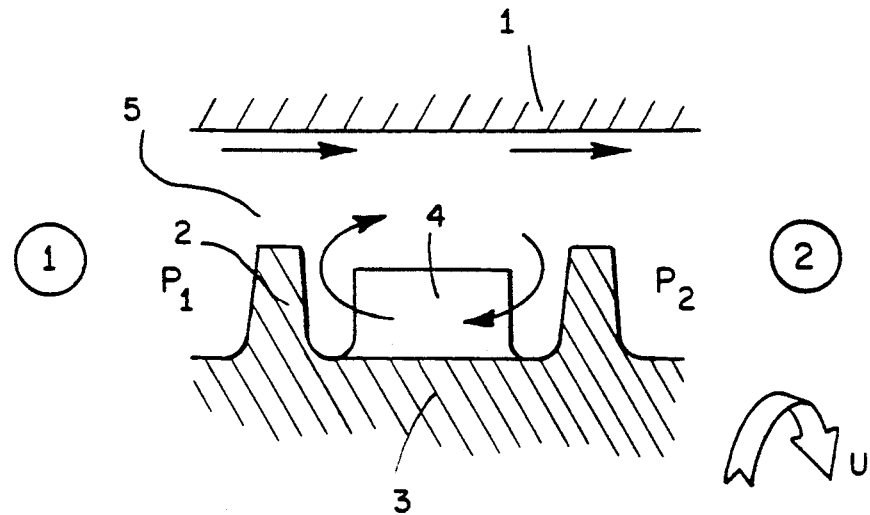
FIG. 1a is a partial side schematic view of a rotor with a seal with axial auxiliary blades constructed according to a preferred embodiment of the invention.

As shown in FIG. 1a, the flow machine has a stator 1 and a housing, at the inside wall of which, a flow medium, such as gas, flows along the arrow (in FIG. 1a, horizontally). Between the inside wall of the stator, the housing and the sealing points 2 of the rotor 3, auxiliary blades 4 are arranged in the center at a distance. The space between the sealing points and the inside wall of the stator has the reference number 5.

The swirling of the flow medium in the chamber formed by the auxiliary blades 4 between the sealing points is also indicated in FIG. 1a by means of arrows. The same is true for the rotating direction (large arrow ) U.

FIG. 1a also shows that the auxiliary blades 4 with the sealing points 2 separate two spaces from one another, with the admission pressure P1 (on the left side) which is larger than the exhaust pressure P2 (on the right side in FIG. 1a).

Figure 1B:
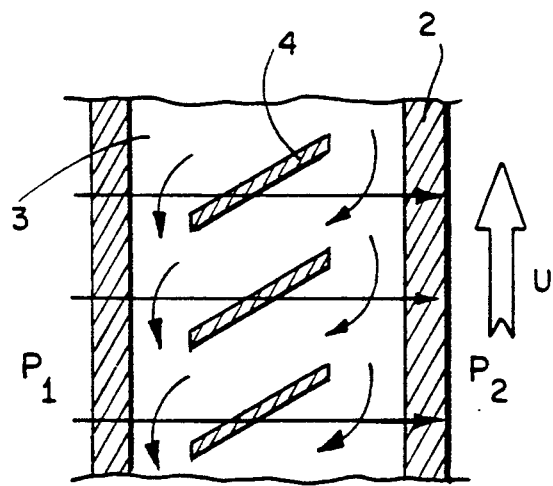
Figure 3:
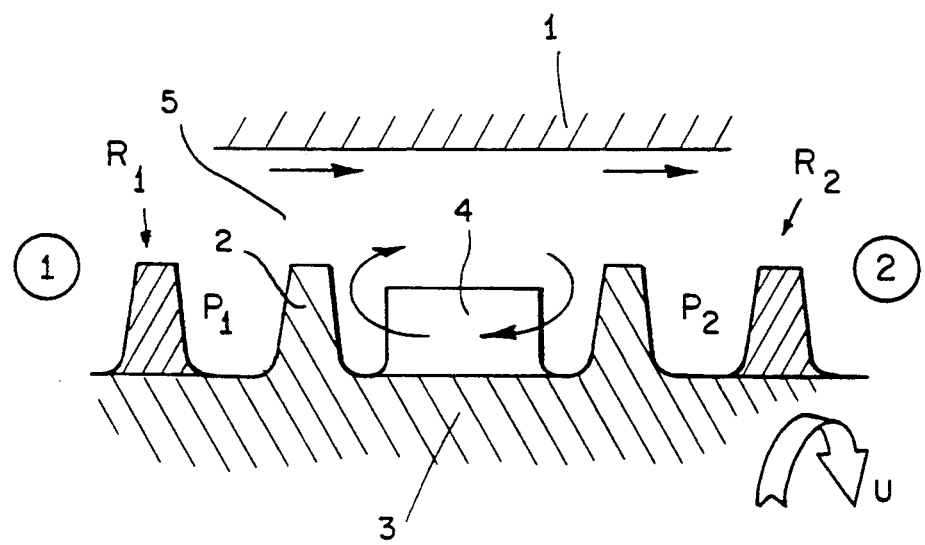
FIG. 3 schematically depicts a seal with auxiliary blades constructed in accordance with certain preferred embodiments of the invention where the seal is disposed axially between rotor blade stages of the rotor.

FIG. 1b shows a projection of the rotor according to FIG. 1a in which the acute angle of attack of the auxiliary blades 4 to the rotor axis is shown clearly. Flow directions are indicated by arrows, and the rotating direction is indicated by large arrow U. Apart from that, the same reference numbers are used in all figures. The number of blades is chosen according to the size of the rotor and the purpose of application. It practically does not differ from the number of moving (compare FIG. 3 schematically depicting primary moving blade stages $R_1$ and $R_2$) or guide blades that are normally used for the same size.

Figures 2A, 2B:
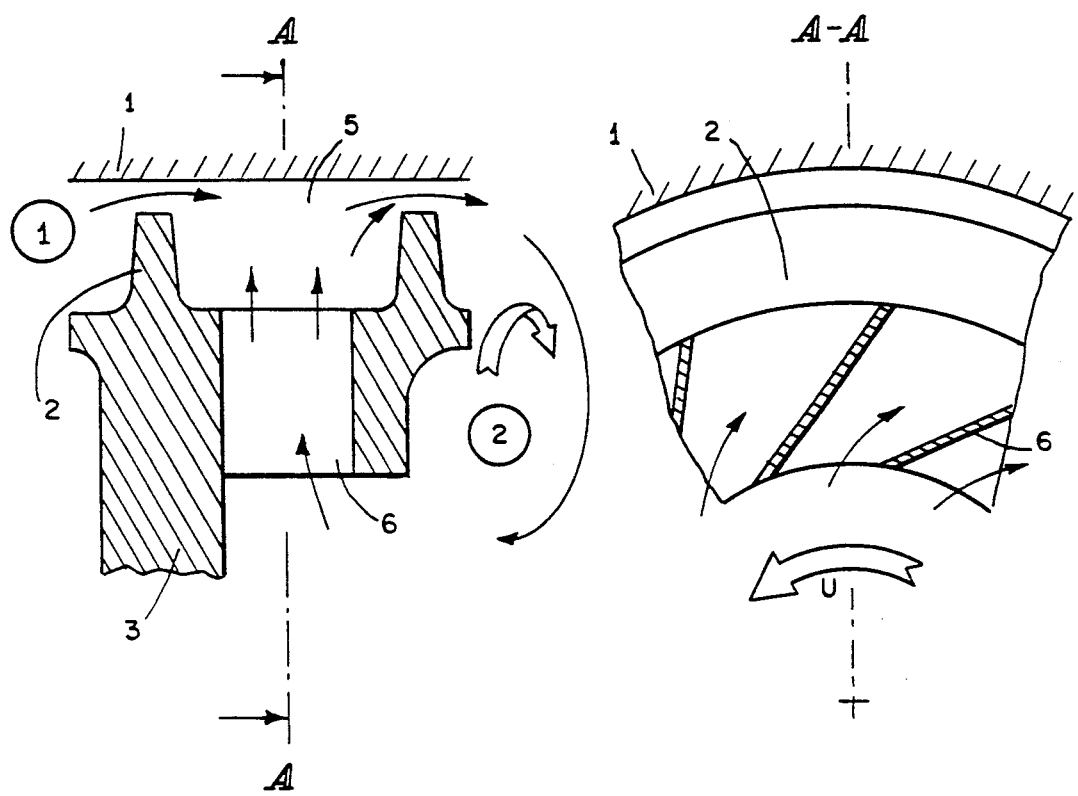
FIG. 2a is a partial side schematic view of a rotor with a seal with a radial auxiliary blade system constructed according to a preferred embodiment of the invention.
FIG. 2b is a partial section along Line A—A.

In contrast to FIG. 1a, FIG. 2a shows a radial auxiliary blade having reference number 6. The flow of the flow medium and the rotating direction of the rotor in this case is again indicated by corresponding arrows.

In FIG. 2a, the blade 6 is also like the blade 4 in FIG. 1a arranged in the center between two sealing points 2. However, the chamber that is available for swirling in this case is somewhat larger than in the case of the first embodiment.

FIG. 2b shows particularly clearly the angle of attack (acute angle) of the auxiliary blades 6 on the rotor 3 and the disk or partial disk divided at A—A (may also be welded on or soldered on like a grid). Also in this case, the flow and rotating directions are indicated by arrows. The shape of the blades (also aerodynamically), their dimensions, angles of attack and number must be adapted to one another with respect to the swirling effect, but are otherwise freely selectable within the indicated limits. The adaptation may be made by an expert depending on the design of the flow machine.

FIG. 3 schematically depicts preferred embodiments wherein primary rotor blade stages $R_1$ and $R_2$ are arranged at the respective upstream and downstream ends of the seal formed by sealing points 2 and auxiliary blade 4. Preferred embodiments are also contemplated wherein one or more main rotor blade stages are disposed on rotor shaft 3 depicted in FIG. 2a and 2b, located respectively spaced from the sealing configurations with auxiliary blades 6 and sealing points 2.

In especially preferred embodiments the main rotor blades which generate the flow of air along the rotor 3 are completely separate from the auxiliary blades 4 or 6. The sealing points and the auxiliary blades are designed as a seal for air flow in the space 5 between the rotor and the surrounding stator housing inside wall, which air flow is also induced by the main rotor blades (compare FIG. 3). With these preferred embodiments where the auxiliary blades are completely separate from any main rotor blades, these auxiliary blades can be designed and provided in a number for optimizing their sealing as described herein.

Modifications of these embodiments are possible without exceeding the scope of the invention. In particular, the auxiliary blades may be provided with remote control elements for changing the attack angle.

The blades 6 may form a special blade grid or may be manufactured in one piece with the rotor.

The rotor 3 may also be constructed of several pieces. In particular, it may have a ring or a rotor disk 3, having tow adjacent thinner disks with the sealing points 2, shown on the right and on the left in the drawing. In axial direction, these parts are, for example, secured on a central shaft. The parts may be arranged between normally bladed rotor stages and/or stator stages, such as the guiding apparatus of a flow machine, or viewed in axial direction, at the start or the end of this type of flow machine or stage.

The sealing arrangement of the invention can be used in general machine construction in the case of high-speed machines for sealing a (radial) space between the rotor and the stator when two chambers of varying pressure exist in axial direction of the rotor, particularly in the case of flow machines, such as turbines, compressors, blowers, chargers or the like. Also the invention can be used in the construction of power stations (construction of electric machines), for stationary use and in the construction of vehicles or aircraft for movable use.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Flow machine sealing arrangement for the clearance space between a rotor and stator of a flow machine such as an axial flow turbine, compressor, blower, charger or the like, said sealing arrangement separating high and/low pressure chambers and comprising
    a pair of axially spaced sealing points defining narrow flow path points between the stator and rotor, said sealing points being formed by a pair of radially outwardly protruding sections carried on the outer circumference of the rotor, and
    auxiliary blade means distributed around the circumference of the rotor and extending radially outwardly of the rotor axis, said auxiliary blade means being disposed between the pair of sealing points and including means for generating turbulent flow in response to relative rotation of the stator and rotor to thereby improve the sealing in the region of the sealing points, wherein the auxiliary blade means extend radially outwardly of the outer circumference of the rotor and are configured to induce an axial flow in the direction of the high pressure chamber, and
    wherein the auxiliary blades are selected in a number that increases with the size of the rotor diameter.

2. Flow machine sealing arrangement according to claim 1, wherein the dimensions of the auxiliary blade means are selected to be smaller than those of the sealing points, with respect to the outside diameter and the distance to the stator.

3. Flow machine sealing arrangement for the clearance space between a rotor and stator of a flow machine such as an axial flow turbine, compressor, blower, charger or the like, said sealing arrangement separating high and/low pressure chambers and comprising
    a pair of axially spaced sealing points defining narrow flow path points between the stator and rotor, said sealing points being formed by a pair of radially outwardly protruding sections carried on the outer circumference of the rotor, and
    auxiliary blade means distributed around the circumference of the rotor and extending radially outwardly of the rotor axis, said auxiliary blade means being disposed between the pair of sealing points and including means for generating turbulent flow in response to relative rotation of the stator and rotor to thereby improve the sealing in the region of the sealing point, wherein the auxiliary blade means extend radially outwardly of the outer circumference of the rotor and are configured to induce an axial flow in the direction of the high pressure chamber, and wherein the angle of attack of the auxiliary blade means is selected to be larger with an increasing rotational speed.

4. Flow machine sealing arrangement for the clearance space between a rotor and stator of a flow machine such as an axial flow turbine, compressor, blower, charger or the like, said sealing arrangement separating high and/low pressure chambers and comprising
    a pair of axially spaced sealing points defining narrow flow path points between the stator and rotor, said sealing points being formed by a pair of radially outwardly protruding sections carried on the outer circumference of the rotor, and
    auxiliary blade means distributed around the circumference of the rotor and extending radially outwardly of the rotor axis, said auxiliary blade means being disposed between the pair of sealing points and including means for generating turbulent flow in response to relative rotation of the stator and rotor to thereby improve the sealing in the region of the sealing points, wherein said auxiliary blades extend radially outwards from the rotor axis through an opening located intermediate said sealing points to a circumferential swirling chamber intermediate the sealing points.

5. Flow machine sealing arrangement according to claim 4, wherein said auxiliary blade means are inclined relative to radii extending outwards of the rotor axis.

6. Flow machine sealing arrangement according to claim 4, wherein the pair of sealing points are disposed on the rotor axially intermediate main rotor blade stages carried by the rotor.

7. Flow machine sealing arrangement according to claim 6, wherein the dimensions of the auxiliary blade means are selected to be smaller than those of the sealing points, with respect to the outside diameter and the distance to the stator.

8. Flow machine sealing arrangement according to claim 7, wherein said auxiliary blade means are configured to induce an axial flow in the direction of the high pressure chamber.

9. Flow machine sealing arrangement for the clearance space between a rotor and stator of a flow machine such as an axial flow turbine, compressor, blower, charger or the like, said sealing arrangement separating high and/low pressure chambers and comprising a pair of axially spaced sealing points defining narrow flow path points between the stator and rotor, said sealing points being formed by a pair of radially outwardly protruding sections carried on the outer circumference of the rotor, and auxiliary blade means distributed around the circumference of the rotor and extending radially outwardly of the rotor axis, said auxiliary blade means being disposed between the pair of sealing points and including means for generating turbulent flow in response to relative rotation of the stator and rotor to thereby improve the sealing in the region of the sealing points, wherein the pair of sealing points are disposed on the rotor axially intermediate main rotor blade stages carried by the rotor.

10. Flow machine sealing arrangement according to claim 9, wherein said rotor further carries a plurality of main rotor blades, and wherein said auxiliary blade means are mounted at the rotor independently and separate from the main rotor blades.

* * * * *